United States Patent [19]
Endriz

[11] 4,077,054
[45] Feb. 28, 1978

[54] SYSTEM FOR MODULATING A FLAT PANEL IMAGE DISPLAY DEVICE

[75] Inventor: John Guiry Endriz, Trenton, NJ

[73] Assignee: RCA Corporation, New York, N.Y.

[21] Appl. No.: 769,653

[22] Filed: Feb. 17, 1977

[51] Int. Cl.² .............................................. H04N 5/68
[52] U.S. Cl. .............................. 358/242; 315/169TV; 315/30; 315/383; 340/324 M; 358/64
[58] Field of Search ....................... 358/59, 56, 64, 65, 358/241, 242; 315/11, 12, 169 TV, 383, 30; 340/324 M

[56] References Cited

U.S. PATENT DOCUMENTS 3,541,254  11/1970  Orthuber ......................... 358/242 X

*Primary Examiner*—Robert L. Richardson

*Attorney, Agent, or Firm*—E. M. Whitacre; George E. Haas

[57] ABSTRACT

Electron beams in a cathodoluminescent display device are modulated utilizing a means for generating a voltage proportional to the instantaneous electrical charge on the cathodoluminescent screen and means for generating a periodic reference waveform having a peak voltage proportional to a sampling of the incoming video signal. A differential amplifier compares the voltage proportional to the electrical charge on the screen to the instantaneous voltage of the reference waveform. A regulator controls the flow of electrons to the screen so as to force the voltage which is proportional to the instantaneous screen charge to approximate the reference waveform voltage.

11 Claims, 5 Drawing Figures

SYSTEM FOR MODULATING A FLAT PANEL IMAGE DISPLAY DEVICE

BACKGROUND OF THE INVENTION

The present invention relates to flat image display devices employing feedback electron multiplication and specifically to a method for modulating the electron beam in such devices.

Several different types of devices have recently been suggested for producing a large area television display. One such device incorporates a plurality of electron multipliers each generating an electron beam which excites a different section of a cathodoluminescent screen. Coupled with the electron multipliers are modulating, focusing and accelerating electrodes to direct, shape and accelerate the electron beam toward the cathodoluminescent screen. The electron multipliers operate in a regenerative feedback mode. Specifically, the output of the multiplier, in addition to bombarding the screen, generates a feedback species, such as positive ions. The feedback species travel back to and strike the cathode of the multiplier thereby emitting secondary electrons and completing a feedback loop so as to produce sustained electron emission.

One of the difficulties in utilizing a plurality of individual electron sources to project an image is that such sources are intrinsically non-uniform in their output because of unavoidable variations in multiplier dimensions and secondary emission properties. As a result, the light output from the phosphor material of the cathodoluminescent screen, may vary from one area of the screen to another due to unequal excitation by the different electron beams. In addition, the flow of electrons from each multiplier must be modulated to provide the proper brightness level for the corresponding picture element of the display. If such devices are to be utilized for image display applications, such as television, a high degree of brightness uniformity and gray scale control are required.

To solve the brightness uniformity problem, one previous system sensed the charge build up on the screen due to the electron beam bombardment of each individual image element. The charge is directly related to the excitation of the phosphor elements and the brightness level of the emitted light. The electron beam in this system is cut off when a specified charge is reached which corresponds to the desired brightness level for that particular picture element. Although this system solved the uniformity problem, the rapid cut off of the electron beam required fast switching with relatively high circuit current levels. This requirement necessitated a relatively expensive switching circuit.

SUMMARY OF THE INVENTION

A system for modulating a flat panel display device having a cathodoluminescent screen comprises means for generating a voltage proportional to the instantaneous electrical charge on the screen. Also included in the system is a means for generating a waveform having a period equal to the dwell time of a single display element and an amplitude proportional to the amplitude of a sampling of the incoming video signal. A comparator means compares the voltage which is proportional to the instantaneous electrical charge on the screen to the instantaneous voltage of the predetermined waveform. A regulating means controls the flow of electrons to the screen in response of the output of the comparator.

DETAILED DESCRIPTION OF THE PREFERRED EMBODIMENTS

Figure 1:
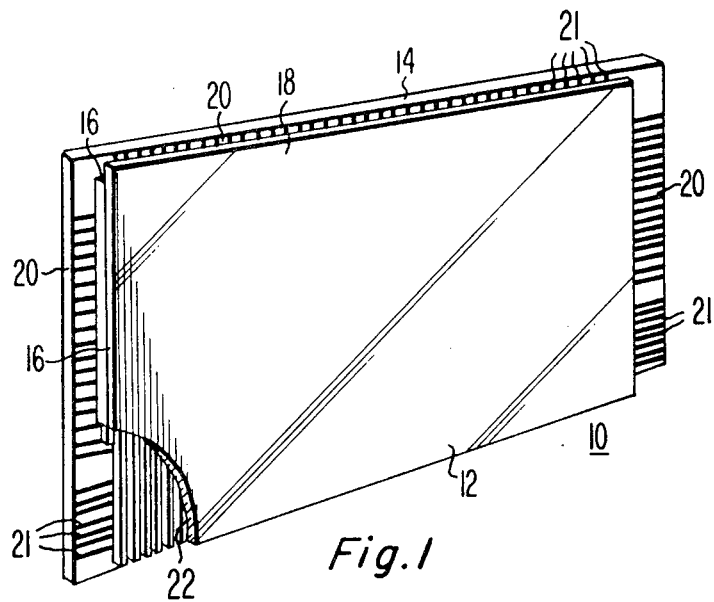
FIG. 1 is a cut-away perspective view of a flat image display device incorporating the present system for modulation.

With initial reference to FIG. 1, a large area image display device, generally designated at 10, has an envelope with a faceplate 12 and a rear panel 14 connected by four sidewalls 16 all of which may be made of glass. The rear panel extends beyond the sidewall 16 forming terminal areas 20 having a plurality of electrical terminals 21 thereon. The interior surface of the faceplate 12 has a cathodoluminescent screen 22 thereon. The cathodoluminescent screen 22 may be a conventional phosphor screen formed by alternating stripes of phosphor material which emit red, green and blue light for a color display.

Figure 2:
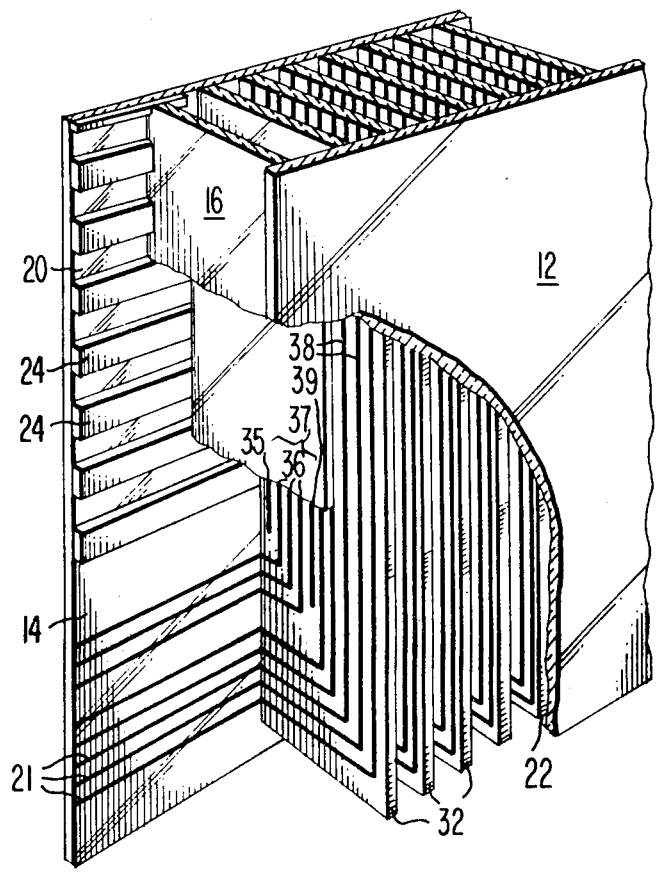
FIG. 2 is an enlargement of the cut-away section of FIG. 1.

With reference to FIG. 2, a plurality of parallel cathode stripes 24, of an ion secondary electron emissive material, preferably MgO, are on the interior surface of the rear panel 14. Extending between the faceplate 12 and rear panel 14 are a plurality of spaced parallel vanes 32 orthogonal to the cathode stripes 24. A plurality of electrodes 35, 36, 38, and 39 are on both surfaces of each vane 32. The first electrode 35 is an address electrode and the next three electrodes 36 on each vane form a dynode chain of a conventional electron multiplier 37 which is formed between adjacent vanes 32. On both sides of each vane 32, between the electron multiplier 37 and the faceplate 12, are a plurality of accelerating and modulating electrodes 38 and 39. The cathode stripes 24, multipliers 37 and modulator electrode 39 form electron beam sources. Modulating electrodes 39 form electron shutters which permit or inhibit electron flow depending upon the applied bias voltage.

Figure 3:
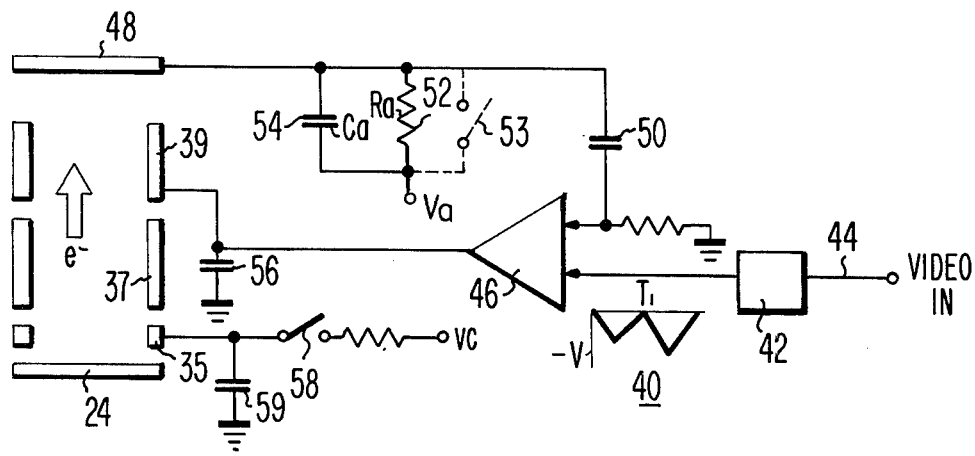
FIG. 3 is a schematic diagram of a circuit for modulating the display device of FIG. 1.

The electron beam generated in the electron beam source 43 may be modulated utilizing a circuit designated 40 in FIG. 3. The modulating circuit 40 incorporates a waveform generator 42 to generate a negative triangular-shaped waveform shown in the graphical insert to FIG. 3. This waveform has a period T, equal to the display element dwell time of a color picture element for the display. The display element dwell time is defined as the maximum time in which the phosphor screen may be excited for a given color picture element. Other periodic waveforms, such as a full wave rectified sinusoidal waveform may also be used. The output of the waveform generator is coupled to an input of a voltage comparator 46. The other input for the voltage comparator 46 is coupled to the anode 48 of the cathodoluminescent screen 22 by means of a high voltage DC isolation capacitor 50 which passes only the voltage variation due to electron bombardment of the anode.

Alternatively, opto-electronic coupling may be used. The anode is also connected to a source of anode voltage $V_A$ by means of an anode resistor 52, while a capacitor 54 in the schematic diagram represents the intrinsic anode capacitance between adjacent electrodes. The output of the comparator 46 is coupled to the modulator electrodes 39 on the vane 32 so as to bias the modulator electrodes. The individual multiplier address electrodes 35 are biased by a voltage source $V_c$ by means of a switch 58. The switch 58 may be a transistorized switch controlled by a pulse from an internal clock for the display device. Capacitors 56 and 59 represent the intrinsic capacitance of the modulator electrodes 39 and the address electrodes 35, respectively.

The display image is presented as a succession of horizontal lines. The line to be displayed is selected by biasing the corresponding cathode stripe 24 to a potential which will emit electrons. The picture elements along the selected line are displayed simultaneously by addressing all of the electron multipliers or sequentially by addressing a portion of the electron multipliers. The addressing is accomplished by properly biasing the respective address electrodes 35 to potential $V_c$. When a given electron multiplier is addressed, the electrons flow from the cathode and are multiplied by the various dynodes 36 of the multiplier 37 producing an electron beam at the end of the multiplier closest to the screen 12. The control circuit 40 applies a bias to the modulator electrodes 39 to modulate the flow of electrons from the electron multiplier. The focusing and accelerating electrodes 38 accelerate the electrons toward the screen 22 and focus them to display a picture element on the cathodoluminescent screen.

The intensity of the electron beam from the electron multiplier is controlled by modulation circuit 40 shown in FIG. 3. One circuit may be utilized to control each multiplier or the electron multipliers may be multiplexed so that a few modulator circuits can control a large number of electron multipliers. One such multiplexing scheme is shown in U.S. Pat. application Ser. No. 709,411, and now U.S. Pat. No. 4,051,468, entitled "Apparatus and Method for Modulating a Flat Panel Display Device" filed on July 29, 1976 by Jan Rajchman.

As the electrons from the electron multiplier strike the screen 22, a negative charge builds up on the anode electrode 48 and leaks off through the anode resistor 52. By sensing the voltage on the anode with respect to a reference point, such as anode bias voltage $V_a$, the instantaneous charge on the anode may be sensed since $V = Q/C$, where V is the instantaneous voltage between the anode and the reference point, Q is the instantaneous charge on the anode, and C is the capacitance between the anode and the adjacent electrodes. The voltage on the capacitively and resistively loaded anode is sensed by the comparator 46 through the high voltage capacitor 50.

The incoming video signal on line 44 is sampled, stored and fed to the generator 42 once every display element dwell time (T), by conventional sampling techniques. The voltage level of the sampled video signal controls the peak voltage of the triangular waveform for that dwell time. As shown in the graphical insert in FIG. 3, the negative waveform voltage varies depending upon the video brightness level for the corresponding picture element, i.e., the brighter the picture element, the greater the peak negative voltage. The modulated triangular waveform is also fed to the comparator 46 or differential amplifier 46.

The differential amplifier generates an output corresponding to the relationship between the sensed voltage of the anode and the instantaneous voltage of the triangular waveform. When the sensed anode voltage is greater (i.e., less negative) than the triangular waveform voltage, the differential amplifier 46 biases the modulator electrodes 39 so as to increase the electron flow thereby increasing the buildup of the negative charge and decreasing the anode voltage. When the sensed anode voltage is less (i.e. more negative) than the triangular waveform voltage, the differential amplifier 46 biases the modulator electrodes 39 to decrease the electron flow thereby inhibiting the buildup of negative charge on the anode and a further decrease in anode voltage. Basically, the circuit 40 provides a feedback mechanism for controlling the flow of electrons so that a predetermined level of brightness set by the amplitude of the triangular waveform is obtained. The modulator electrode bias voltage is controlled to regulate the electron beam so that the sensed anode voltage is tailored to conform to the triangular waveform whose amplitude is controlled by the video signal. Specifically, the anode voltage approximates a triangular waveform corresponding to the waveform from the generator 42.

Ideally, the voltage sensing scheme is characterized by an anode resistance 52 such that the anode time constant $\tau_a = C_a r_a$ is much faster than the characteristic frequencies in the saw-tooth waveform. Therefore, the anode voltage sensed by the differential amplifier 46 will be directly proportional to the anode electron beam current $I_a$. In reality $r_a$ must be somewhat larger in order to enhance the magnitude of the anode signal. Thus, some phase lag exists between the anode beam current and the voltage. In certain applications, it may be advisable for $r_a$ to be eliminated. All embodiments, however, are characterized by a continuous anode voltage sensing means of matching anode voltage to a predetermined waveform.

By controlling the modulator electrode potential to contour the anode voltage to the triangular waveform, the brightness uniformity problem is solved without rapidly switching relatively high currents, since the electron beam is not rapidly cut off. The specific waveform employed is not critical as long as the contouring allows sufficient electron beam excitation of the picture elements to achieve the various brightness levels. In each picture element dwell time, the waveform builds from an initial voltage level (zero in the previous sample) to a peak voltage which varies with the brightness level for that picture element. After the peak voltage is reached, the waveform slowly returns to the initial voltage level for the next cycle. The regulation of the electron beam so that the sensed anode voltage conforms to the triangular waveform ensures that a fixed electron charge strikes the screen during the element dwell time regardless of the specific electron gun characteristics. Therefore, in the present display, the brightness of the entire screen will be uniform even though different sections are excited by different electron beams.

In the embodiment shown in FIG. 3, when a particular electron multiplier is not on, the charge on the anode electrode due to the prior electron beam bombardment will leak off the anode through the anode resistor 52 and the anode potential will return to the anode voltage bias $V_a$. In an alternate system, the anode resistor 52 may be eliminated from the circuit and replaced by a switch 53 which is operated by a clocking pulse to discharge the electrical charge on the anode during the non-scanned time.

Figure 4:
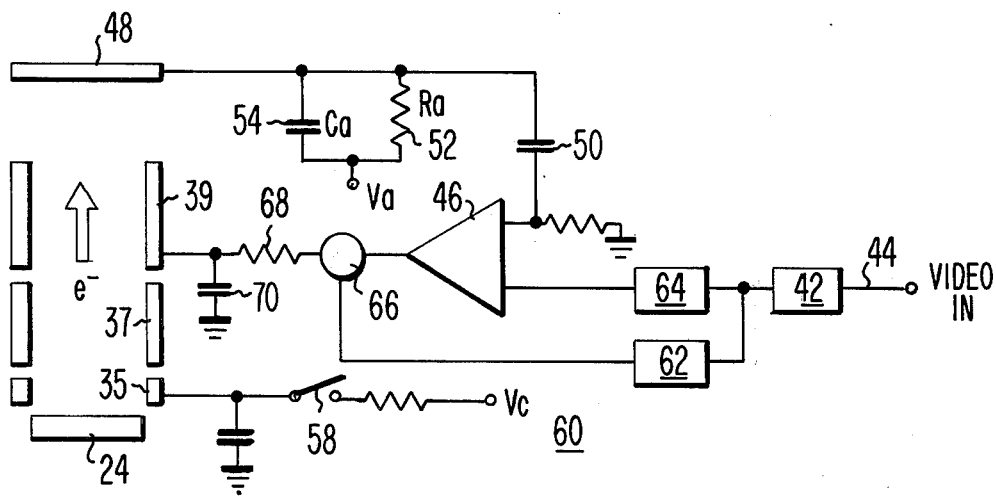
FIG. 4 is a schematic diagram of an alternate circuit according to the present invention for modulating the display device of FIG. 1.

An alternate system for accomplishing the video modulation is shown in FIG. 4. The waveform generator 42 produces a triangular shaped waveform having a period equal to the dwell time of a picture element and an amplitude which varies proportionally to the sampled video input. However, the embodiment of FIG. 4 utilizes a dual video channel system as opposed to a single video channel in the embodiment in FIG. 3. Specifically, the output of the waveform generator 42 is coupled to an amplifier 62 and to a delay line circuit 64. The output of the delay line circuit is connected to the input of a differential amplifier 46. The other input of the differential amplifier 46 is coupled to the anode electrode 48 by means of a high voltage DC blocking capacitor 50. A capacitor 54 represents the intrinsic capacitance of the anode capacitor and a resistor 52 couples the anode electrode to an anode bias voltage source $V_A$. An adder 66 combines the output of the differential amplifier 46 and the amplifier 62. The output of the adder 66 is coupled to the modulator electrodes 38 by a resistor 68. A capacitor 70 represents the intrinsic modulator electrode capacitance.

The second embodiment 60 shown in FIG. 4 is similar to the circuit 40 in FIG. 3 in that the waveform generator 42 produces a periodic waveform having a period equal to the dwell time of a picture element of a display and an amplitude which varies with the video input signal. However, in the second embodiment, the triangular waveform is amplified to directly bias the modulator electrodes. This direct biasing is accomplished by amplifying the periodic waveform in the amplifier 62 and passing it through the adder 66 and resistor 68. The differential amplifier 46 compares the sensed anode voltage with the periodic waveform and produces an output which alters the bias on the modulator electrodes slightly if the two compared voltages are unequal. Specifically, if the sensed voltage from the anode electrode is greater than the triangular waveform voltage at any given instant, the comparator will produce a positive voltage which will be combined in the adder 66 with the triangular waveform from the amplifier 62. This combination of the two voltages will increase the biasing voltage provided by the amplifier 62 increasing the electron flow. The additional electron flow then decreases the anode voltage until it is equal to the instantaneous voltage of the triangular waveform. If the sensed anode electrode voltage is less than the instantaneous voltage of the triangular waveform the comparator will produce a negative voltage which will be combined with the biasing voltage from the amplifier 62 to bias the modulating electrodes 39 to partially inhibit the electron flow. This decreased electron flow then slows the rate of decrease of the anode voltage until it reaches equality with the negative triangular waveform. The modulator capacitor 70 and the anode capacitor 54 and anode resistor 52 cause an inherent time lag in the feedback circuit. The phase delay circuit 64 between the circuit waveform generator 42 and the comparator 46 delays the waveform to the comparator so that its voltage will be in phase with the sensed voltage from the anode.

In the present system, the modulator control circuit is used to unify the electron beam currents from the various sources in the image display device by sensing the relative strength of the electron beam as it impinges the screen and regulating the electron flow accordingly. The present system through the use of a periodic waveform modulated by a sampled video signal, eliminates the abrupt cut off of the electron beam flow and the corresponding necessity to rapidly switch relatively high currents. In the present system, a periodic waveform is used in which the amplitude of the waveform varies according to the sampled video input signal. The remainder of the circuit is basically a feedback system for regulating the electron beam to contour the sensed anode voltage to the generated periodic waveform. The shape of the waveform is constructed so that such contouring will provide enough excitation of the cathodoluminescent screen by the electron beam as to illuminate the screen to the desired brightness level.

When the basic feedback modulation control system as disclosed herein is employed in a multiplexed fashion in the display device 10 having a plurality of adjacent electron multipliers, a certain degree of cross talk may exist between adjacent sensing circuits. In the display device shown in FIGS. 1 and 2, the thickness of the glass vanes 32 is necessarily very small in order to reduce the area of contact with the surface of the phosphor screen 22. Therefore, the interanode electrode distances are very small and the capacitances between the electrodes on adjacent sides of a vane 32 are therefore large. In fact, well over half of the total anode capacitance may be represented by the interelectrode capacitance between adjacent anodes. Since the electron bombardment of the anodes produce time varying voltages these intrinsic capacitances can cause extremely serious cross talk problems during sensing whereby the apparent reading of the charge on the anode electrode is in error by an amount related to the signals on its adjacent anode electrodes.

Figure 5:
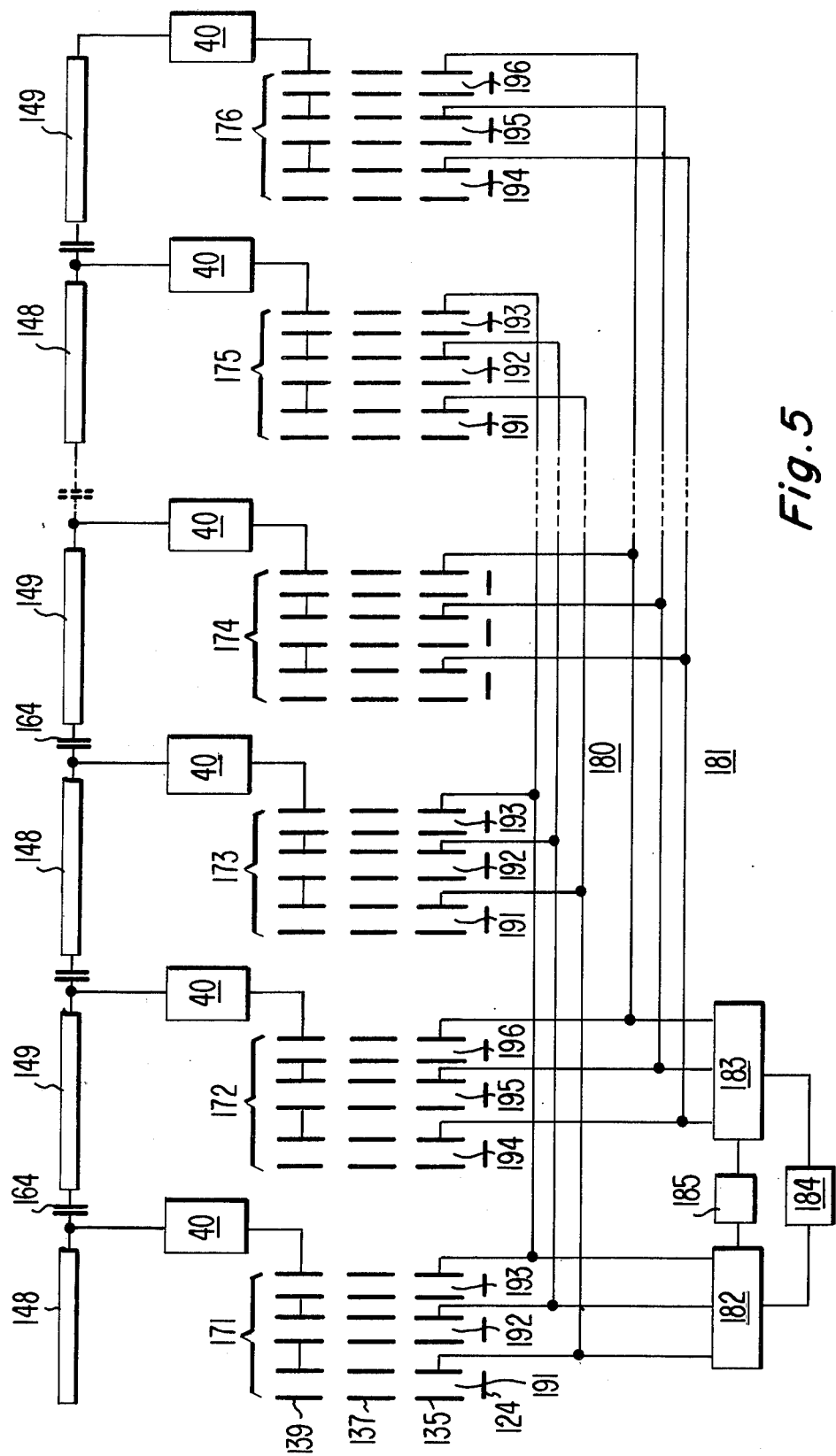
FIG. 5 is a schematic diagram of a system for multiplexing a plurality of the present modulating control circuits.

Various multiplexing schemes may be incorporated in order to reduce or eliminate the modulation control cross talk. As shown schematically in FIG. 5, anode electrodes 148 and 149 extend across the output of a group 171 or 174 respectively of several adjacent electron sources, each composed of a cathode 124, address electrodes 135, an electron multiplier 137 and modulator electrodes 139. A capacitor 164 between adjacent anode electrodes 148 and 149 represents the intrinsic anode crosstalk capacitance in the device structure. Connected to each of the anode electrodes 148 and 149 is a separate modulation control circuit 40 which controls the biasing of all the modulation electrodes in the group of sources, as shown in FIG. 3. Each control circuit 40 senses the charge on the anode electrode 148 or 149 and converts it to a proportional voltage. This voltage is compared to the sampled incoming video signal and the comparison regulates the biasing of the modulator electrodes 139 in each of the electron beam sources associated with the particular anode electrode.

The address electrode 135 of the odd numbered groups 171, 173, and 175 are connected to a first set of busses 180. A second set of buses 181 connects the address electrodes 135 of the even numbered electron source groups 172, 174 and 176. Both sets of buses 180 and 181 sequentially connect the individual electron sources of each even or odd groups in common. A separate address electrode switching circuit 182 and 183 is connected to each set of buses 180 and 181. The two switching circuits connect address voltages from a source 184 to the various individual buses and in turn to the address electrodes 135 in response to signals from a clock 185.

When a line is to be scanned in the display device, the clock 185 activates the first bus switching circuit 182 which applies an address potential from the power sources 184 to all the first electron sources 191 in each of the odd numbered groups 171, 173, 175. The picture elements associated with the first sources 191 then are displayed. The switch circuit 182 then sequentially addresses each of the other address electrodes 135 in the odd numbered groups. This sequential addressing scans the sources 191-193 in the odd groups 171, 173 and 175 during the first half of the display line time while the even numbered electron sources group are blanked off at their address electrodes. Then, in the second half of the display line time, the clock 185 activates the second switching circuit 183 and deactivates the first switching circuit 182 to blank the sources 191-193 in the odd groups. The electron beam sources 194-196 in the even numbered groups 172, 174 and 176 sequentially scanned in a manner identical to the scanning of the odd numbered groups 171, 173 and 175 to display the picture elements associated with the even groups. At any one time only the even numbered anode electrodes 148 or the odd numbered anode electrodes 149 are sensing electron beams while the other set of anode electrodes are not being bombarded. Therefore, the anode electrodes adjacent to the sensing anode electrodes do not have an electron beam induced time varying voltage and the cross talk problem between the anodes is greatly reduced. By utilizing the anode switches 53 of the control circuit 40 (FIG. 3) to pin the deactivated anodes to a fixed voltage, the crosstalk can be totally eliminated. Conventional signal processing techniques may be employed to store a line of the video signal and reprocess it so as to scan the even and odd numbered guns in the proper sequence. Other techniques of multiplexing electron sources, so that adjacent anode electrodes are off during sensing by one of the electrodes, are readily apparent from the present description.

I claim:

1. A system for modulating an image display device having a cathodoluminescent screen comprising:
    means for generating a voltage proportional to the instantaneous electrical charge on the screen;
    means for generating a periodic waveform having a periodicity equal to the display element dwell time and having an amplitude proportional to a sampling of the incoming video signal for a picture element to be displayed;
    a comparator for comparing the voltage proportional to the instantaneous electrical charge on the screen to the instantaneous voltage of the periodic waveform;
    means for regulating the flow of electrons to the screen in response to the output from the comparator to vary the generated voltage so that it is contoured to the periodic waveform.

2. The system as in claim 1 wherein the means for generating a voltage proportional to the electrical charge on the screen comprises an anode electrode on the inner surface of the screen and an anode resistor connected to the anode electrode.

3. The system as in claim 1, wherein the means for generating a periodic waveform comprises a saw-tooth generator.

4. The system as in claim 1, wherein the comparator comprises a differential amplifier which generates the output proportional to the voltage difference between the periodic waveform and the voltage proportional to the instantaneous electrical charge on the screen.

5. The system as in claim 4, wherein the regulating means comprises at least one modulator electrode, the modulator electrode being biased by the output from the differential amplifier.

6. The system as in claim 5, further including:
    a phase delay between periodic waveform generating means and the differential amplifier;
    an amplifier having an input connected to the periodic waveform generating means; and
    an adder having inputs connected to both the differential amplifier output and the amplifier output and an output connected to the modulator electrode.

7. In a flat image display having a plurality of feedback electron multipliers, at least one modulation electrode for modulating the output of the electron multipliers and a cathodoluminescent screen, the improvement comprising:
    means for sensing the electrical charge on the screen and generating a voltage proportional to the sensed instantaneous charge;
    means for generating a periodic waveform having a period equal to the dwell time of a picture element and an amplitude proportional to a sampling of the incoming video signal for a picture element to be displayed; and
    a comparator for comparing the voltage proportional to the electrical charge on the screen to the instantaneous voltage of the periodic waveform, the output of the comparator connected to bias the modulator electrodes.

8. The device as in claim 7, wherein the comparator comprises a differential amplifier which generates an output proportional to the difference between the periodic waveform, and the voltage proportional to the electrode charge on the screen.

9. The device as in claim 8, further comprising:
    a phase delay between the periodic waveform generating means and the differential amplifier;
    an amplifier having an input connected to the periodic waveform generating means; and
    an adder having inputs connected to the differential amplifier and the amplifier and its output connected to the modulator electrode.

10. A flat image display device having a cathodoluminescent screen comprising:
    a plurality of adjacent electrode beam sources each having an electron multiplier and a modulation electrode, the sources being divided into two sets of alternating groups of adjacent electron beam sources;
    a plurality of anode electrodes on the screen each anode for sensing the electron beams from the sources in one group;
    a plurality of modulation control circuits, each circuit connected to a different group and comprising means for generating a voltage proportional to the instantaneous electrical charge on an anode electrode, means for generating a periodic wavefrom having a periodicity equal to the display element dwell time and having an amplitude proportional to a sampling of the incoming video signal for a picture element to be displayed, a comparator for comparing the voltage proportional to the instantaneous electrical charge on the anode electrode to the instantaneous voltage of the periodic waveform, and means for biasing the modulator electrode for the beam which was sensed by the anode electrode to contour the generated proportional voltage to the periodic waveform;

means for alternately addressing each set of groups of electron beams sources; and means for sequentially addressing the electron beam sources in each group of an addressed set.

11. A method for modulating an electron beam in a display device having a cathodoluminescent screen, comprising:

generating a periodic waveform having a peak amplitude which varies proportionally with the incoming video signal;

sensing the electrical charge on the screen;

generating a voltage proportional to the sensed instantaneous charge;

comparing the voltage proportional to the sensed charge to the instantaneous voltage of the periodic waveform; and regulating the electron flow proportionally in response to the comparison of the two voltages.

* * * * *